United States Patent

[11] 3,622,527

| [72] | Inventors | Dieter Dieterich<br>Leverkusen;<br>Artur Reischl, Leverkusen; Harro Witt,<br>Cologne-Buchheim, all of Germany |
|---|---|---|
| [21] | Appl. No. | 723,306 |
| [22] | Filed | Apr. 22, 1968 |
| [45] | Patented | Nov. 23, 1971 |
| [73] | Assignee | Farbenfabriken Bayer Aktiengesellschaft<br>Leverkusen, Germany |
| [32] | Priority | Apr. 28, 1967 |
| [33] | | Germany |
| [31] | | F522761VC/39B |

[54] MICROPOROUS SHEET AND A PROCESS FOR THE PRODUCTION THEREOF
13 Claims, No Drawings

[52] U.S. Cl. .................................................. 260/2.5 AY,
117/63, 117/161 KP, 161/159, 161/160, 161/164,
260/77.5 AH, 260/77.5 AP, 260/77.5 AX,
260/775 H, 260/77.5 R, 260/858, 264/41,
264/331, 264/DIG. 62, 264/DIG. 77
[51] Int. Cl. ........................................................ B29d 27/04,
B29d 27/08, C08g 22/00, C08g 22/44
[50] Field of Search ............................................ 264/41, 49,
DIG. 77, DIG. 62, 331; 260/77.5, 2.5 AY, 77.5
AM, 77.5 AX, 77.5 AP, 77.5 R, 858; 117/63, 161
KP; 161/159, 160, 164

[56] References Cited
UNITED STATES PATENTS

| 3,100,721 | 8/1963 | Holden .......................... | 264/41 UX |
| 3,190,765 | 6/1965 | Yuan ............................. | 264/41 UX |
| 3,281,396 | 10/1966 | Barnes .......................... | 264/41 UX |
| 3,296,016 | 1/1967 | Murphy ......................... | 264/49 X |
| 3,348,963 | 10/1967 | Fukushima et al. ............. | 264/41 UX |
| 3,369,925 | 2/1968 | Matsushita et al. ............. | 264/41 UX |
| 3,388,100 | 6/1968 | Thoma et al. .................. | 264/41 UX |
| 3,449,153 | 6/1969 | Saligny et al. ................. | 264/41 X |

*Primary Examiner*—Philip E. Anderson
*Attorneys*—Robert A. Gerlach and Clelle W. Upchurch

ABSTRACT: Microporous sheets or molded articles, permeable to water vapor are prepared from sedimenting and redispersible aqueous polyurethanes. The dispersions are in microgel form, the particles having an average minimum diameter of from 2 to 500 microns, preferably 8 to 100 microns. A second component binds the microgel together without impairing the microporosity. The products of the invention are useful as artificial leather in the preparation of raincoats, handbags, belts, shoes, upholstery and also as vibration and sound-damping materials.

MICROPOROUS SHEET AND A PROCESS FOR THE PRODUCTION THEREOF

This invention relates to a process for the production of sheets or molded articles that have a coherent microporous structure, from aqueous dispersions or pastes. This particular structure provides for a commercially very advantageous combination of properties which cannot be achieved, or can only be achieved with considerable expenditure, by other known processes.

A substance is said to have a coherent microporous structure if it is built up from at least two phases, one of which is air in the form of a capillary system which consists of intercommunicating cavities that have cross-sectional diameters of the order of 0.5 to 10 $\mu$.

This structure is characterized by a microscopically recognizable morphology as well as by the particular density of the material, which is lower than that of a homogeneous material of the same type. Comparison of the permeabilities to water vapor may also be used as a characterizing criterion, since any microporosity increases this permeability. It is only in extreme cases that the absolute value of the permeability to water vapor can be used as evidence for the presence of micropores since hydrophilic homogeneous materials also have a high permeability to water vapor (see Belgian Pat. No. 626,803). Further such criteria are the volumetric compressibility, which is anomalously high for a solid body, and the high light-scattering power which causes a material that is colorless in a homogeneous layer to appear white.

By the term "microheterogeneous" is meant hereinafter a structure which represents a borderline case of microporosity. The air capillary system is in this case a boundary layer which makes practically no contribution to the density of the system as a whole but is nevertheless clearly visible microscopically as the common boundary surface between what were previously several latex particles. This boundary surface is especially hydrophilic and therefore contributes to the permeability of the system to water vapor. Materials which are colorless as a homogeneous layer appear opaque and cloudy in the microheterogeneous form.

Most of the processes that have hitherto been described for the production of sheets and coatings from solutions, dispersions, pastes or plastic masses, lead to homogeneous materials which have no microscopically visible morphological structure. The polymeric material in these cases is generally uniformly distributed. When such materials are broken, the surface of the break is generally smooth or even glossy.

If the homogeneous materials are homogeneous mixtures of different types of polymers, mixing is not complete owing to the generally very low mixing entropy of polymers. Electron microscopy reveals a morphological fine structure in the region of about 10 to 500 m$\mu$. Such "ultramicroheterogeneities" are very widespread in polymer materials (see e.g. E. H. Erath, M. Robinson, J. Polym. Sci. Part C (1962), No. 3, page 65–76, but are generally not readily recognizable as such and do not influence the nature of the surface, the density and the permeability to air and water. "Ultramicroheterogeneous" substances of this kind are not included within the scope of the present invention.

Polymers which represent two-phase systems are also known (U.S. Pat. No. 2,600,024). For example, numerous acrylonitrile-butadiene-styrene polymers consist of two polymer phases which are compatible but not miscible with each other. One essential feature of such two-phase systems, however, is that one phase is homogeneous and the second phase is distributed in such a way in the first phase that all the particles of the disperse second phase are completely enveloped by the homogeneous first phase and embedded in it. The system is therefore an incoherent, colloidally disperse system in which both phases are solid. There is no third coherent or incoherent gaseous phase. Such a system can be obtained, for example, by mutually coagulating a mixture of a styrene-acrylonitrile copolymer in latex form which has not been cross-linked with a (modified) polybutadiene also in latex form, and molding the resulting material in the usual manner to produce a homogeneous body which then has an "internal" rubber phase for elasticizing and an "external" resin phase. The two-phase structure of such a system can easily be seen on broken surfaces by the electron microscope. Under an optical microscope, however, such substances also appear homogeneous. Their broken surfaces also have a smooth to glossy appearance.

It has also been proposed to manufacture lacquer coatings that consist predominantly of microgel particles produced by emulsion polymerization which are employed together with a linear polymeric binder (Belgian Pat. No. 628,194). Here again there is formed an ultramicroheterogeneous structure without a gaseous phase, in which a lyophilic dispersion of a microgel in a dissolved linear polymer is applied by drying.

Lastly, it is also known that aqueous dispersions of vinyl polymers or of certain polyurethanes dry at sufficiently low temperatures to form microheterogeneous or even microporous sheets. The microheterogeneity of such structures reveals itself in the matt surface, opaque cloudy appearance, dry and somewhat rough handle and lack of resistance to solvents and swelling agents. When moistened with water, the surface in many cases quickly becomes white since the water immediately penetrates the microscopically visible microgaps, an effect which is promoted by concentration of the emulsifier at the boundary surfaces. The mechanical properties such as tensile strength and abrasion resistance are usually also unsatisfactory. One therefore aims to cause the microheterogeneity to disappear, e.g. by increasing the temperature so that the particles that are delimited from each other start to fuse and intermesh or melt together, or by the addition of plasticizers which promote conversion of the particles into films.

In Belgian Pat. No. 653,223 the production of emulsifier-free latices of high molecular weight polyurethanes which can be dried to form sheets is disclosed. The latex particles of the dispersions produced by the process may be cross-linked or not, depending on the proportions of reactants employed. The average diameter of the individual latex particles may vary and is preferably in the region of from 0.3 to 1 $\mu$. The upper limit of the particle size, however, is set by the need for stability in the latex. Stability in this case means the property of the latex particles to resist gravity so as not to sediment or coagulate within a certain period of time, e.g. 24 hours. The capacity of latices to "cream up," on the other hand, is not to be regarded as a property that impairs the stability. Latices that are stable in this sense, as described in Belgian Pat. No. 653,223, have average particle diameters of less than 2 $\mu$. On drying, latices of this type generally yield homogeneous films; if the latex particles are very hard or cross-linked, microheterogeneous, opaque films may be formed, but these melt at elevated temperatures to form homogeneous films.

The present invention, on the other hand, relates to the production of microporous sheets or molded articles that are mechanically stable and stable to solvents and remain microporous at 100° C.

Numerous methods are known for the production of microporous substances the structure of which can be rendered visible by means of an optical microscope and thus lies above the colloidal region of between about 2 and 500 $\mu$.

Thus, for example, nonwoven fiber mats which can be produced from natural or synthetic fibers or, for example, from glass fibers by numerous processes are reinforced with polymer binders and if desired compressed, whereby very firm microporous sheets are obtained.

According to a preferred embodiment, collagen is used as fiber material in this process, and gelatine together with a cross-linking agent as binder. Although these structures are microporous, they are at the same time to a greater or less extent permeable to water, owing to their relatively coarse structure. Further, their surfaces are unsatisfactory as regards abrasion resistance, handle and resistance to soiling.

In other processes for the production of microporous sheets polymers dissolved in solvents are coagulated by means of precipitating agents. In particular, nonsolvents such as water or steam are used for this purpose. In these processes, the polymer is precipitated in a very fine form and yields substantially smooth surfaces with a leathery handle, which surfaces have a distinct microstructure under the microscope. Such a material is porous, permeable to water vapor but impermeable to water itself. This material is preferably used as component of a multilayer system in combination with other porous sheets, e.g. woven or nonwoven textiles.

Another process makes use of atomization of polymer solutions in organic solvents with the aid of a turbulent gas stream, the atomized fibers drying on a support to form a microporous covering layer.

Lastly, numerous methods are available for subsequently rendering homogeneous sheets inhomogeneous by mechanical treatment, for example, by partly tearing the sheets or tearing the edges or by perforating; a homogeneous two-phase system can also be converted into a porous structure by subsequently washing out one of the phases. The component used as the phase that can be washed out may, for example, be a salt or starch, substances which can easily be removed, e.g. by treatment with water.

According to Belgian Pat. No. 664,168, a process is known by which fine powders which consist of linear thermoplastic polyurethanes of low modulus of elasticity and which may be obtained by precipitating the dissolved polyurethanes, for example, by means of cyclohexane or water, are applied to a textile sheet which is permeable to water vapor and are solidified by pressure and heat. Cross-linking may at the same time be achieved by the addition of masked isocyanates.

These processes lead to products which vary greatly in their strength, handle, flexibility and wearing comfort. One common feature, however, is that in all cases very special methods of procedure and therefore special apparatuses are required for obtaining the desired end product. Furthermore, some of the processes are commercially very expensive. Thus the coagulation process generally requires high-boiling solvents, accurately observed atmospheric moistures and several operational stages in order to achieve the desired finely divided coagulation. The solvent must be completely washed out with water and, for reasons of economy, recovered from the aqueous solution.

It is also known that polymer dispersions consisting of microgel particles can be produced by emulsion polymerization or emulsion polyaddition. In this process, each latex particle represents a cross-linked elastomer particle. When such dispersions are dried, optically cloudy, elastic films are obtained which have a certain microporosity if the particles are sufficiently large, owing to the fact that on drying, the particles do not fuse but are only mechanically slightly intermeshed. As a result of this, sheets of this type have unsatisfactory mechanical properties, in particular poor resistance to tearing and resistance to tearing at the edges and high abrasion. In particular, they are extremely sensitive to water and organic solvents, which penetrate the micropores and treats the loose bonds between the particles, so that the sheets disintegrate.

Although these disadvantages can be obviated by heat treatment, the permeability of the product to water vapor is thereby also lost.

It is therefore an object of this invention to provide a simplified process for the manufacture of microheterogeneous and especially microporous sheets or molded articles. It is another object to provide microheterogeneous or microporous sheets from aqueous dispersions or pastes of synthetic high molecular weight compounds. It is another object to provide microheterogeneous or microporous sheets or molded articles having very good mechanical properties, low thermoplasticity and above all, excellent resistance to water and organic solvents.

The foregoing objects and others which will become apparent from the following description are accomplished in accordance with this invention, generally speaking, by providing relatively large microgel particles of one component A from an aqueous medium stacked together to form a structure having the appearance of caviar which provides microporosity, whereupon this structure is solidified by means of a binder or impregnating component B which binds the microgel particles together by a chemical surface reaction. Component B must on no account fill up the gaps in A but only should form a thin layer which adsorbs on the surface and which reacts chemically with the surface during the drying process. The special feature of the mode of operation according to the invention thus consists in that two cross-linking processes take place which are separated from each other in time and location, one occurring inside the individual particles, whereby these particles acquire the nature of a microgel, and the other between the particles, on their surfaces.

It has surprisingly been found that the use of aqueous dispersions or aqueous concentrates (e.g. pastes) of polyurethanes in microgel form affords special advantages for the production of microporous sheets compared with the application of organic solutions or dispersions or dry powders (which can easily be produced from aqueous dispersions). Thus application on the support or substrate by simple processes commonly employed for dispersions or pastes can also be done in very thin layers (from 50 $\mu$ upwards), the known disadvantages of working with light powders or solvents being obviated, and the application of pressure (e.g. by rolling or pressing) for the solidification process being dispensed with.

Preliminary solidification is already achieved during drying of the moist layers by the surface energy of the water, the polyurethane microgel particles, especially if they are not spherical conglomerating to form a very dense packing without the need for application of pressure.

In principle, all sorts of different starting materials can be used for synthesizing the microgel particles of component A, and the synthesis itself may in principle be carried out by the process polymerization, polyaddition or polycondensation, or by a combination of these processes. By far the best result, however, are achieved with components A of the type that are obtained by the polyisocyanate polyaddition process. Although the chemical nature of the microgel particles is generally of secondary importance for the process, with the provision that they should enable sufficiently large gel particles to be produced which have reactive groups on the surface, it nevertheless significantly influences the overall properties of the end products. It is also advantageous to employ the isocyanates polyaddition process in the production of such microgel particles in that it enables the size, surface, swelling index and surface reactivity of the microgel particles to be adjusted particularly accurately to the desired values. Component A is therefore, in this case, a polyurethane, polyurea or polyurethane urea.

The present invention relates to a process for the production of microporous sheets or molded articles that are permeable to water vapor, based on polyisocyanates and compounds that have reactive hydrogen atoms, characterized in that sedimenting and redispersible aqueous polyurethane (urea) dispersions or aqueous concentrates (e.g. pastes) obtained from them, which contain at least the following components in the solid substance which is free from filler:

(A) 65–99 percent by weight of polyurethane (urea) microgel particles which are insoluble in methyl ethyl ketone and cannot on their own form homogeneous films at temperatures below 60° C. and which have an average minimum particle diameter of 2 to 500 $\mu$, (preferably 8 to 100 $\mu$) and carry on their surface reactive groups that are capable of reacting with component B, (B) 1–35 percent by weight of a polyfunctional thermoplastic polymer containing at least two groups that are reactive with the surface of (A) for every 2,000 molecular weight unit and/or one low molecular weight compound that has a cross-linking action on the surface of (A) and that has at least two groups that are reactive with the surface of (A) and an average molecular weight of at the most 2,000, are treated if desired with up to 50 percent by weight, based on the total amount of dry substance, of fillers, dyes, textile agents or vinyl polymers, and heat treated but below the fusion temperature of (A) at elevated temperature whereby chemical cross-linking and mechanically sintering occurs.

By the process according to the invention, a particularly high degree of cross-linking of the polymers is achieved, which in the case of homogeneous materials would appear as excessive cross-linking with corresponding deterioration in properties. Surprisingly, however, by virtue of the fact that a microstructure develops, the degree of cross-linking in the substances produced according to the invention is found not to be excessive.

The microgel particles of component A are in many cases more or less spherical. This occurs particularly if in the production of organic solutions, substantially linear polyurethane (urea)s are dispersed in water without the aid of shearing forces or if water is added to such solutions. The shape may also deviate considerably from the spherical and elongated or even fibrous shapes can be obtained, e.g. under the action of powerful shearing forces, and in processes in which cross-linking starts even during dispersion, or if hydrophobic, fiber-forming polyurethane (urea)s are used which have a tendency to be precipitated from organic solution in a fibrous form by the action of water. Lastly, a microgel particle may also be an agglomerate of even smaller particles, and this agglomeration may be due to a chemical process (chemical cross-linking during latex formation) or a typical colloidal chemical (e.g. coagulation) process. Nonspherical particles or agglomerates are especially suitable for use in the process according to the invention.

For the production of microgel particles A, which may be polyurethanes or polyurethane polyureas numerous known methods as well as new methods to be described hereinafter, of isocyanate polyaddition may be employed.

The different modes of carrying out the diisocyanate polyaddition process are advantageously used in the production of microgel particles because they enable an especially high degree of reaction control to be achieved and because the process can be varied within wide limits as desired, both as regards the reactants and as regards the molecular weight, number and arrangement of positions of cross-linking, particle size and physical properties of the system during and after the preparation. This applies especially in respect of those methods of preparation described hereinafter that makes use of spontaneous dispersion of salt-type polyurethanes. Dispersions of polyurethanes that have cationic or anionic salt groups in the polyurethane molecular are therefore especially preferred starting materials for use in the process according to the invention. They enable suspensions that have minimum particle diameters of between 8 and 100 $\mu$ and maximum diameters of between 20 and 2000 $\mu$ to be produced by simple means (e.g. the usual stirring mechanisms rotating at low speeds). Particles of this size, which are insoluble in tetrahydrofuran and moreover have a Shore hardness A of 30 and 98 (measured on the homogeneous product) are particularly suitable for use in the process according to the invention, e.g. for use in the production of microporous sheets for clothing.

Thus polyurethane microgel dispersions or pastes of component A can be produced e.g. by the process according to German Pat. Nos. 1,184,946; 1,178,586; 1,179,363; and Belgian Pat. Nos. 653,223 and 658,026. The process described in German Auslegeschrift No. 1,097,678, French Pat. No. 1,108,785 British Pat. No. 883,568, Belgian Pat. No. 663,102 and U.S. Pat. No. 3,213,049 may in principle also be used in the production of suitable polyurethane microgel dispersions but they are less suitable. Furthermore, the products of the process described in Belgian Pat. No. 636,799 can easily be converted into suitable dispersions. These documents also list starting materials by way of example, which can be used for the production of the polyurethane microgels.

The polyurethane microgel dispersions or pastes of component A and the thermoplastic polymers of component B may be prepared by reacting organic compounds containing active hydrogen atoms that are reactive with NCO groups and having a molecular weight of from about 300 to about 4,000 with organic polyisocyanates and if desired chain extending agents. Any suitable compound containing active hydrogen atoms may be used, such as, for example, polyesters, polyethers, polyacetals, polyhydric polythioethers and the like.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxymethylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like.

Any suitable amino alcohol such as, for example, b-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane 4,4'-bis-hydroxy ethyl ether and the like.

Any suitable polyhydric polyalkylene ether may be used such as, for example, the condensation product of an alkylene oxide with a small amount of a compound containing active hydrogen-containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Pat. No. 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(b-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable chain extending agent containing active hydrogen atoms which are reactive with NCO groups and having a molecular weight less than about 300 may be used such as, for example, water, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(b-hydroxy ethyl ether), 1,3-phenylene-bis-(b-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis-(2-chloroaniline), 3,3-dichloro-4,4'-biphenyl diamine, 2,6-diaminopyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene disulfonic acid dihydrazide, omega-amino-capronic acid dihydrazide, gamma-hydroxy butyric hydrazide, bis-semi-carbazide, bis-hydrazine carbonic esters of glycols such as any of the glycols heretofore mentioned and the like. The reaction may also be carried out in the complete absence of these low molecular weight compounds.

Any suitable organic diisocyanate may be used in reaction with the organic compound containing active hydrogen atoms such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenyl propane-4,4'diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like.

Stable polyurethane dispersions may be obtained by the above-mentioned prior art processes, i.e. dispersions in which the particles have average particle diameters below 2 $\mu$ and which are therefore less suitable for the production of microporous or microheterogeneous sheets according to the present invention. In order that these products may be used for the process according to the invention, they must therefore be converted into agglomerates that have a particle diameter of at least 2 $\mu$. Below are therefore described in detail particular embodiments and as new processes, by means of which microgel dispersions or pastes of component A of the type that are preferred according to the invention can be prepared. One must distinguish fundamentally between processes in which dispersion and internal or intralaticular cross-linking of the resulting latex particles occur at different time, and those in which the two stages are carried out simultaneously. In all cases, polyurethane or polyurethane urea microgel particles A result.

A. Preparation of polyurethane (urea) microgel particles by cross-linking latex particles after dispersion Noncross-linked, optionally branched polyurethane compositions that are soluble in organic solvents (see in particular Belgian Pat. No. 653,223) containing a low percentage (e.g. 0.01 to 2 percent) of salt-type groups

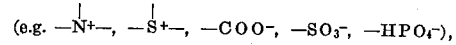

are dispersed, if required via the organic solution in water and in such a manner that the dispersed particles have average particle diameters above 2 $\mu$ and preferably above 8 $\mu$. This may be achieved, for example, by one or more of the following measures:

1. Incorporation of particularly low quantities of salt-type groups,

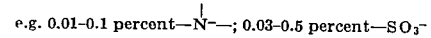

that is quantities which are no longer sufficient for the production of stable dispersions.

2. Addition of electrolytes, e.g. neutral salts, acids, bases and also polyelectrolytes or electrolyte generators, e.g. acid chlorides or sulfuric acid esters.

3. The use of slightly polar solvents such as acetone, methyl ethyl ketone, methylene chloride, carbon tetrachloride benzene or toluene.

4. Stirring the organic or aqueous organic polyurethane solution into water (in order to achieve finely divided dispersions, the procedure should be reversed).

In order to achieve intralaticular cross-linking of the resulting coarse latex particles, bi- or polyfunctional agents suitable for cross-linking may be added either to the organic solution or to the aqueous dispersion, different type of cross-linking agents being suitable depending on the chemical nature of the polyurethanes used. Suitable combinations of functional groups in the ionic polyurethane composition and cross-linking agents for them are shown in the following table:

| Functional groups in the noncross-linked polyurethanes | Cross-linking agent |
| --- | --- |
| —CO—NH—R, —NH—CO—NH—R, —NH—NH—R, —OH, —NH$_2$, (—O—CO—NH—R) | Polyisocyanates, isocyanate splitters, uretdiones, formaldehyde, formaldehyde splitters, methylol ethers and the like, polyaziridines, divinyl-sulphone. |
| —N— | Quaternizing agents, polyacids. |
| —S—<br>—CH=CH$_2$ | Quaternizing agents.<br>Sulphur, S$_2$Cl$_2$, if required with vulcanization accelerators, peroxides, aliphatic azo compounds. |
| —COOH, —SO$_3$H, —HPO$_4$$^-$ | Polybases, oxides, hydroxides, carbonates or polyvalent metals. |
| —NH$_2$, —COOH | Polyepoxides. |

The incorporation of these functional groups in the high molecular weight polyurethane is carried out by known processes, in particular by the use of chain-lengthening agents such as diamines, water, hydrazine, carboxylic acids, dimethyloldihydropyran or bis-hydroxyethyl allylamine. If the polyurethane is rendered cationic by the quaternizing reaction, functional groups may be introduced subsequently, for example, also via the quaternizing agent. Suitable quaternizing agents of this type, are, for example, chloroacetamide, bromoethanol, chloroacetic hydrazide, allyl bromide and bromoacetic acid.

Slowly reacting cross-linking reagents may be added to the (dissolved) polyurethane composition before the dispersion. In such a case, they themselves are also dispersed and the polyurethane itself serves as an emulsifier. Very reactive cross-linking agents, especially compounds that react as ions, such as polyacids and polybases, may in some cases have to be added subsequently to the dispersion.

One may often incorporate the cross-linking agent as monofunctional compound initially in the polyurethane composition. Thus, for example, polyfunctional quaternizing agents may be used in the quaternizing reaction one function reacting with the high molecular weight polyurethane, alkylation taking place, and the second function only reacting in the resulting latex particles, as cross-linking takes place.

Methylol ethers can also easily be incorporated, e.g. as

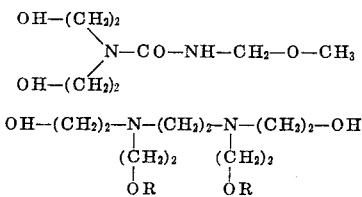

OH—(CH₂)₂—N—(CH₂)₂—N—(CH₂)₂—OH
         |           |
         (CH₂)₂      (CH₂)₂
         |           |
         OR          OR or also as chloroacetamide-methylolethers.

By choosing suitable pairs of cross-linking and acceptor groups and by adjusting the preparation of the dispersion accordingly, the time and extent of cross-linking within the latex particles can be controlled. Polyurethanes that are hydrophilic and therefore readily solvated in the latex particles are less liable to undergo spontaneous cross-linking than coarse particles that do not undergo swelling. Cross-linking can therefore also be achieved by converting a finely divided stable latex that is capable of spontaneous cross-linking into a coarse latex in known manner by the addition of, for example, coagulating agents such as acids, bases, salts, polyelectrolytes or flocculating agents. In systems that are produced by formaldehyde cross-linking, cross-linking can also be achieved e.g. by lowering the pH. The intralaticular cross-linking of the particles, however, can also be achieved by heating the latex, for example, to 80° C.

Since cross-linking takes place in the heterogeneous system, its existence cannot be shown by the usual methods, e.g. by checking the viscosity. It can, however, be followed very easily by removing latex samples at certain times and diluting these samples with a solvent such as tetrahydrofuran or dimethylformamide.

Latices of particles that are not cross-linked dissolve causing a substantial increase in viscosity. The viscosity is especially high at the beginning of the cross-linking reaction but decreases as cross-linking increases. At the same time, the dilute latex remains cloudy since the cross-linked particles can no longer disentangle themselves. Highly cross-linked latices can be diluted with dimethyl formamide without any marked change in the appearance and viscosity.

To prepare ionic cross-linked polyurethane dispersions that are suitable for use in the production of microheterogeneous and, in particular, microporous sheet structures or molded articles, one may according to a new process use solutions of known nonionic polyurethanes which contain small quantities of an ionic polyurethane as emulsifier. Ionic polyurethanes generally serve as excellent emulsifiers in the usual production of nonionic polyurethanes. Surprisingly, even additions of only 0.2 to 4 percent of an ionic polyurethane impart remarkably high dispersibility in water to a conventional nonionic polyurethane solution coarse particled, unstable latices that are excellently redispersible being formed by way of preference. Such unstable latices or pastes are especially suitable for use in the production of microporous sheets.

The emulsifier may be mixed with the polyurethane that is to be emulsified in organic solution, and water may be stirred in, or alternatively the organic phase may be stirred into the aqueous phase. The ionic, generally water-soluble (colloidal) polyurethane may, of course, also be initially added to the aqueous phase. Efficient stirrers, especially those that exert a vigorous shearing effect, assist the dispersing process and lead to the formation of nonspherical, elongated or fibrous particles which are especially valuable for use in the production of microporous sheets having good mechanical properties. It should, however, be emphasized that dispersion can also be carried out using simple mixing devices.

One may also use the usual low molecular weight or higher molecular weight emulsifiers such as fatty alcohol sulfonates, long-chained alkyl ammonium salts, hydroxyethylated alcohols, etc., in the formation of dispersion from the polyurethane compositions, which may be in solution. In this case, however, high-speed stirrers are required and the organic phase should be added to the aqueous phase and not the converse.

B. Preparation of polyurethane (urea) microgel particles by cross-linking latex particles simultaneously with dispersion thereof.

If highly reactive cross-linking systems are used, and in particular cross-linking agents which react in the presence of water, the chemical process of cross-linking cannot be carried out separate from the process of dispersion. This applied especially to the dispersion of polyurethanes that still contain free isocyanate groups. Thus when polyurethanes which carry NCO groups and which are not water-soluble (colloidal) are converted into the aqueous phase, substantially cross-linked latex particles are obtained which may be isolated or combined to form agglomerates, depending on the particular dispersion method chosen in the individual case. Individual particles are generally obtained in cases where a polyurethane composition which contains NCO groups is dispersed with the aid of emulsifiers and the organic polyurethane phase is added to the aqueous phase with the aid of a high-speed stirrer.

Dispersions of agglomerates of cross-linked particles or fibrous particles are obtained especially when cationic or anionic polyurethane compositions are converted into aqueous dispersions by the addition of water. At least partial cross-linking may occur during the dispersion process even in the absence of isocyanate groups if other highly reactive groups are present, for example, in the case of dispersion of polyurethanes which also contain quaternizing and quaternizable groups and which form comparatively compact particles in water owing to their containing only a small amount of salt-type groups.

Furthermore, sedimenting and redispersible aqueous poly(urethane)urea dispersions are obtained, for example, when polyurethanes and/or poly(urethane)ureas known per se which have ionic groups and free isocyanate groups are dispersed in water in the presence of polyamines and/or hydrazines.

According to a preferred embodiment, the solution of the isocyanate-containing ionic polyisocyanate addition product in a suitable solvent such as acetone, ethyl acetate, methyl ethyl ketone, tetrahydrofuran, benzene or methylene chloride and the dissolved polyamine or hydrazine are combined in water with stirring and the organic solvent is distilled off. If dimethylformamide is used as solvent, suitable aqueous pastes can be obtained by decanting or filtration under suction after the poly(urethane)urea has been precipitated with the aid of water.

C. Preparation of polyurethane(urea)-microgel particles by cross-linking latex particles before dispersion Finally, polyurethanes present in microgel form can also be converted from organic solution into an aqueous dispersion with the aid of emulsifiers or by the incorporation of cationic or anionic groups, the dispersed particles again being in the form of microgels. Dispersions produced in this way are also highly suitable for use in the production of microporous sheets.

According to another process which has not hitherto become known, high molecular weight polyisocyanate polyaddition products that are present in microgel form in organic solvents and that do not contain any groups capable of salt formation can be converted by means of polyurethanes that contain groups capable of salt formation into sedimenting redispersing aqueous dispersions. These salt-type polyurethanes have a specific emulsifying effect so that the ionic polyurethanes are effective in amounts as low as 0.5 percent by weight and upwards, based on the nonionic polyurethane mass. For example, high molecular weight polyisocyanate polyaddition products such as are described in Belgian Pat. No. 664,870 and German Auslegeschrift No. 1,225,381 may be dissolved in a solvent such as acetone, methyl ethyl ketone or tetrahydrofuran, and the polyurethane that is capable of salt formation and suitable for emulsification may be added before salt formation as solid or in solution and salt formation may be allowed to proceed by the addition of acids or bases with stirring. The desired quantity of water may then be added to the organic solution. The organic solvent is removed, e.g. by distillation, if required under reduced pressure. The type of mechanical agitation of the reaction mixture influences both the particle size and the particle form of the resulting aqueous, redispersible polyurethane dispersions.

In principle, these products may also be prepared by other variations of procedure, for example, by combining the dissolved polyisocyanate polyaddition product with the polyurethane (emulsifier) already present in salt form in solution and diluting the mixture with water and removing the solvent, e.g. by distillation. In addition, the aqueous phase may be placed in the reaction vessel and the solution or the hot melt of the polyurethane mass may be added thereto. In this procedure special care must be taken to ensure that the organic phase is sufficiently finely divided. This is achieved, for example, by using high-speed stirrers or ultrasonics or by injecting the organic phase through nozzles. In other methods the emulsifier polyurethane which contains salt groups is employed in the form of an aqueous solution and is combined in this form with the polyisocyanate polyaddition product which is free from salt groups. In all the methods hitherto mentioned, the polyurethanes capable of salt formation are synthesized in such a way that they have the structure of block polymers, i.e. the salt groups are not uniformly distributed in the macromolecule but concentrated in hydrophilic blocks. This block structure is achieved, for example, by synthesizing the polyurethane mass from nonionogenic, apolar, high molecular weight polyhydroxyl compounds and salt-type low molecular weight isocyanates or low molecular weight isocyanates that are capable of salt formation, and/or chain-lengthening agents.

The ionic polyurethane(urea)s may, for example, contain the following groups:

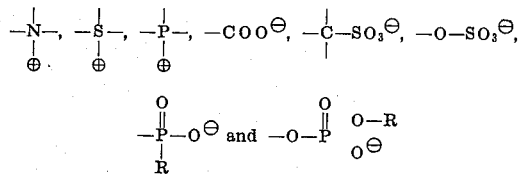

The size of the latex particles that can be produced by the methods described may vary within wide limits, e.g. between 0.2 and 2,000 $\mu$. In the production of microheterogeneous and especially microporous sheets and molded articles according to the invention, however, only aqueous dispersions of component A that have average particle sizes of between 2 and 500 $\mu$, preferably between 8 and 100 $\mu$ may be used. By average particle size is meant the particle size which occurs with the greatest frequency in the particle size distribution. In the case of elongated or fibrous particles, this refers to the cross-sectional diameter. If the particles are smaller than 2 $\mu$, almost homogeneous layers are obtained whereas in the case of particles that are larger than 100 $\mu$ distinctly heterogeneous, macroporous structures result which generally have less advantageous mechanical properties. The known dispersions commonly used e.g. for coatings, which dispersions represent stable, nonsedimenting latices, are thus not suitable for use in the process according to the invention, the dispersions that are suitable being relatively coarse or even pastes which settle in an aqueous medium but can easily be redispersed.

Furthermore, the microgel particles component A to be used in the process according to the invention should be insoluble in the usual organic solvents such as chlorinated hydrocarbons, ethers and ketones. The insolubility may be brought about by cross-linking or by crystallization or powerful intermolecular forces. The insolubility in methyl ethyl ketone is the essential criterion. The swelling index of particles dried at room temperature should not exceed 20, i.e. 1 g. of polyurethane particles should not take up more than 19 g. of methyl ethyl ketone. Particles that have a swelling index of from 2 to 10 are preferred. Materials that have a higher swelling index than 20 tend to form films and impair the microporosity, especially at elevated temperatures. The particles of the suspensions that are preferred in the process according to the invention are even insoluble in tetrahydrofuran or are only soluble therein as a microgel.

Another important property of the microgel particles A which may be used in the invention is the presence of reactive groups on the surface, which groups are capable of reacting with the cross-linking components B.

In principle many different types of reactive groups would be suitable, and the cross-linking component B would then have chosen according to the nature of the reactive group, e.g. the C=C double bond, the hydroxyl, amino, urethane, urea, amide, hydrazide, epoxy, methylol, methylolether, carboxyl, bromo and chloromethyl group. If the reactive group is uniformly distributed in the polymer, as for example, the double bond, in polyurethanes based on polybutadiene or the urethane or urea group in isocyanate polyaddition products, then it will certainly also be present as the reactive group on the particle surface. If, however, the polymer is a block polymer or graft polymer, then a reactive group which is arranged at large intervals or concentrated in certain areas will only be situated on the surface by way of preference if the reactive group is at the same time hydrophilic; for this reason, groups such as hydroxyl, amino, amide, epoxy, methylol, methylolether, methylol acetate, carboxyl and reactive groups that are introduced via an alkylation reaction, e.g. by quaternization with alkyl chloride are especially suitable and in the last-mentioned case they may even be hydrophobic. Reactive groups already present may be rendered temporarily hydrophilic, e.g. by salt information, and thereby be brought to the surface of the latex particles. Tertiary amino groups, for example, will be situated in the salt form on the surface of the latex particles if a polyurethane mass containing such amino groups is dispersed in the presence of acetic acid. The acetic acid can subsequently be removed by drying or neutralization or by washing, so that microgel particles are obtained which can be linked on their surfaces by the action of polyfunctional alkylating agents or polyfunctional acids.

The urethane group, especially if it has been prepared from an aromatic isocyanate, generally has little reactivity in an hydrophobic environment, e.g. towards formaldehyde cross-linking agents. As is well known, polyurethanes which do not contain reactive groups are difficult and in many cases impossible to cross-link with agents that split off formaldehyde (see e.g. German Auslegeschrift No. 1,187,012). The reactivity of the polyurethanes is, however, enhanced in hydrophilic media, and thus also on the surface of latex particles, if highly polar groups such as the quaternary ammonium group or the sulfonate group are adjacent to the urethane group. The same applies to a lesser extent to the more reactive urea group. For this reason, polyurethane microgel particles having ionic groups are particularly easily accessible even under mild conditions of surface cross-linking when carried out by means of substances that split off formaldehyde or similar substances.

Reactive groups can also be introduced at the surface of the suspended particles by using suitable emulsifiers in the preparation of the polyurethane suspensions. Thus, for example, colloidally water-soluble polyurethanes that contain quaternary ammonium nitrogen and, in addition, methylolether, epoxy, aziridine, masked isocyanate, amido, or urea groups in the molecule, can be used as emulsifiers for dispersing nonionic polyurethanes. The dispersed polyurethane particles in this case contain reactive groups only on their surface.

The cross-linking component B used for linking component A may be of low molecular or of high molecular weight and should have a certain minimum of reactive groups relative to the reactive groups on the surface of component A.

Whereas low molecular weight cross-linking components B up to an average molecular weight of 2,000 should have at least two reactive groups, higher molecular weight thermoplastic polymers that have not been cross-linked are invariably polyfunctional and should as a rule have at least two reactive groups for every 2,000 molecular weight units.

The table on page 19 indicates the cross-linking reactive groups suitable for the different reactive groups on the surface of the microgel particles A.

The most universally applicable and advantageous cross-linking agents are derivatives of formaldehyde, such as methylol compounds, oligo-or polyfunctional derivatives of methylol compounds, such as methylol ethers, methylol acetates, methylol-N-acetals (Mannich bases), formaldehyde acetals, urea- or melamine formaldehyde adducts and resols.

These compounds, which may also be in the form of higher molecular weight condensates, for example, with urea, melamine, phenols, or polyvinyl alcohol may be used as cross-linking agents, for example, both for microgel particles produced by the diisocyanate polyaddition process and for polymers which contain, for example, hydroxyl, amino, carboxyl, amido or urea groups.

The following are examples of such cross-linking agents: paraformaldehyde, methylol compounds, methylol ethers or methylol acetates of urea, ethylene urea methylene diurea, diurea methylene ether, hexamethylene diurea, acetylene diurea, hydrazodicarbonamide, acrylamide or methyacrylamide, and homo and copolymers of these compounds, urones, e.g. tetrahydro-1,3,5-oxodiazinone-(4), dimethyl-bis-(ureidoethyl)-ammonium compounds, melamine, dicyandiamide, lauroyl amide, stearylamide, 4,5-dihydroxyl-tetrahydroimidazol-one-(2), polymethylol-polyvinyl alcohol or polyvinyl alcohol polyformal, and adducts of alkoxymethyl isocyanates to compounds that have reactive hydrogen atoms.

Furthermore, compounds that liberate divinylsulfone and epoxides such as diglycicyl-ethylene glycol, vinylcyclohexenedioxide, epichlorohydrin or ethyleneimine derivatives such as adducts of ethyleneimine with polyisocyanates may be used as cross-linking agents.

Microgel particles having basic amino, hydroxyl, sulfide, or mercapto groups on the surface can advantageously be cross-linked with di- or polyfunctional alkylating agents, if desired with the addition of an acid acceptor or with polyfunctional acids. Examples of these alkylating agents are contained in German Auslegeschrift No. 1,156,977 and Belgian Pat. No. 636,799.

Effective cross-linking agents for the microgel particles of component A that contain anionic groups such as carboxylate, sulfonate, phosphate, phosphonate or the corresponding free acids, are apart from inorganic or organic polybases, oxides or salts of polyvalent cations. If the surface of component A has reactive halogen atoms, the cross-linking component B is preferably a polyamine or polysulfide.

Suitable high molecular weight compounds are, for example, homo- or copolymers that have reactive alkoxymethyl, chloromethyl, bromo, epoxy, or carboxyl groups, and non-cross-linked polyurethanes or polyureas containing such reactive groups. Hydrophobic silicones or fluorine compounds containing reactive groups may also be used. It is preferred to use how or high molecular weight substances that are soluble or readily dispersible in water, e.g. water-soluble thermoplastic polyurethanes or polyurethanes or polyureas that can be dispersed in water. If this precondition is not satisfied, a cross-linking dispersion can be prepared with the aid of emulsifiers.

Higher molecular weight polyurethanes or polyureas that contain reactive groups and are suitable as cross-linking agents are preferably used in the form of their aqueous dispersions or colloidal solutions, which can be prepared e.g. according to German Pat. No. 1,178,586 or Belgian Pat. No. 653,223. Dissolved or dispersed polyurethanes of this type can easily be modified with reactive groups, e.g. by including suitable "monomers" with reactive groups. Polymer latices containing reactive groups may, of course, also be used.

Depending on the number of reactive groups present, 1 to 5 percent by weight of cross-linking component B, based on the solid substance free from filler, is sufficient to effect adequate consolidation of the caviar structure formed by the microgel particles. Less effective cross-linking agents may be added in amounts of up to 35 percent by weight, based on the solid substance free from filler. Additions of larger amounts are less satisfactory since they cause the materials to stick and thus lead to undesirable mechanical properties and a stiff, hard handle and loss in microporosity.

It should be borne in mind that when the dispersions or pastes are applied to a porous support, the ratio of components A:B in the dry layer is usually shifted in the favor of component A since the cross-linking component B is frequently more or less water soluble so that a substantial amount of it may, for example, be removed with the water.

The two components A and B may be mixed prior to the application, or B may be used as impregnating component which is subsequently added to the layer formed from component A.

The dispersions or pastes have different flow properties depending on the size and form of the microgel particles, and the technique of application will be most suitable will depend on these flow properties. The products may be applied e.g. by casting, spraying or application with coating knife.

The process according to the invention has the great technical advantage over the known processes for the production of microporous sheets that shaping of the products can be carried out on conventional machinery by methods already in commercial use. The dispersions described above can be applied especially easily as aqueous 30 to 85 percent concentrates by casting or application with a coating knife, since conversion into the paste form, if desired with conventional commercial thickening agents added in amounts of 1 to 10 percent by weight, based on component A, for the purpose of adjusting to the desired viscosity, reduces the sedimentation rate to an amount depending on the concentration and causes the mass to flow smoothly and steadily. Highly concentrated pastes, e.g. with a solids content of about 50 to 70 percent by weight, can be kept for days without phase separation occurring.

The suspensions or pastes prepared in this way are advantageously applied to a porous support which then remains as part of the finished product such as woven or nonwoven textiles or fiber mat, felts or fleeces including paper fleeces, foam plastic foils or split leather, which owing to their suction effect cause immediate solidification of the coating of microgel particles. The product is then dried at elevated temperature and if necessary pressed, the caviar structure of the coating being consolidated in the process. Alternatively, drying may be carried out on smooth, porous or nonporous materials such as metal, glass, paper, cardboard, ceramic material, sheet steel, silicone rubber or aluminum foils, the finished sheets being subsequently detached and used as such or applied by the reversal process to a substrate by adhesion, flame backing or calendering. In this last-mentioned case the substrate should generally be porous. The application by the reversal process may be carried out at any time.

The properties of the products of the process can be modified by adding vinyl polymers or active or inactive fillers. Suitable substances are, for example, polyethylene, polypropylene polyvinyl chloride, polyvinylidene chloride, polyvinyl acetate, ethylene-vinyl acetate copolymers, which may, if required, be at least partly saponified and/or grafter with vinyl chloride; styrene-butadiene copolymers, ethylene-(graft)-copolymers, carbon black, silicic acid, asbestos, talcum, kaolin, titanium dioxide, glass in the form of powder or in the form of fibers, and cellulose. Up to 50 percent by weight of such fillers, based on the amount of dry substance, may be contained in the end product, the amount depending on the desired properties and the purpose for which the end products are to be used. Other high molecular weight compounds such as polycarbonates, may also be included in minor quantities. These additional substances may be added at various stages during the preparation and by different methods. For example, polymers in organic solution or in the form of anhydrous powders may be added during the preparation of the polyurethane dispersions, so that they are constituents of component A. On the other hand, they may be added in the form of their aqueous emulsions or suspensions or as powders to the finished polyurethane suspensions or pastes, in which case they act as fillers.

Dyes, pigments, plasticizers or additive which influence the flow properties may, of course, also be added.

The products obtained by different methods of application may be dried at room temperature or elevated temperature, with care taken that melting and fusion of the material should not occur. The drying temperature chosen in each individual case, which depends both on the chemical composition of the material and on the moisture content, the drying time and the thickness of the layer, is easily determined by a preliminary test. For any given heating time, the drying temperature must lie below the solidification temperature (see below). In no case may the material become transparent during drying.

The material does not solidify if drying is carried out at temperatures between 10° and 40° C. The layers obtained can frequently be crumbled by hand and in many cases are even redispersible in water.

Solidification is effected by the application of elevated temperature, especially between 50° and 180° C., when the particles, at the same time, sinter and intermesh mechanically or undergo partial fusion of the boundary surfaces, and a chemical cross-linking reaction takes place between the boundary surfaces of the particles. The resulting cross-linking of the boundary zone prevents any further, excessive sintering or complete fusion, so that the entire material remains transversed by very fine channels.

Drying, i.e. removal of water and in some cases removal of residual solvents, and solidification may be carried out simultaneously or successively. The solidification temperature of predried products of the process, such as sheets or foils, is about 10° to 30° C. higher than that of the moist sheets. As the water content decreases, the solidification temperature must be increased if comparable results are to be obtained. The duration of application of heat and the thickness of the foil and the application of pressure, when required, e.g. by hot rollers for solidification, are further important factors which considerably influence the microporosity, permeability to water vapor and physical properties of the products according to the invention.

Sheet structure 50 to 400 $\mu$ in thickness can be sintered by application of high temperature for periods of the order of a few seconds in the case of substantially anhydrous foils to a few minutes for sheets that are still slightly moist; for this process, the temperature used may be considerably above the solidification temperature otherwise required for longer drying times. The finished sheet structures according to the invention have a milky opacity, or in most cases, are completely opaque, and have a pleasant warm handle, high tensile strength and low abrasion and are insoluble in many solvents, in many cases even in hot dimethylformamide. The permeability to water vapor is markedly increased over that of corresponding homogeneous materials and in most cases corresponds to that of natural leather. A distinct morphological structure may be seen under the optical microscope. The surface may have a velvety texture or be completely smooth or even glossy, especially if the reversal process has been employed. The sheets may subsequently be coated with a finish to increase their surface resistance. Aqueous dispersions or solutions are also preferably used for this purpose. The products of the process are versatile in their application: e.g. they may be used for air-permeable and water-permeable coatings of all kinds as well as damping materials for absorbing sound and mechanical vibrations.

The products of the process are suitable, e.g. for use in the production of tent sheets, raincoats, handbags, belts, vibration damping materials, shoe shafts, upholstery materials, car upholstery and wallpaper.

The invention is further illustrated by the following examples in which parts are by weight unless otherwise specified.

Preparation of the starting material:

Preparation of polyurethane solutions:

I. About 500 parts of polypropylene ether glycol of molecular weight 2,000 are dehydrated at about 120° C. for abut 30 minutes and stirred together with about 122.6 parts of 4,4'-diphenylmethane diisocyanate at from about 90° to about 100° C. for about 1 hour. About 20 parts of N-methyldiethanolamine in about 400 parts by volume of acetone are added to the mass which has been cooled to about 40° C. After it has been stirred for about 4½ hours at about 55° C., the solution becomes viscous. It is diluted with about 350 parts by volume of acetone and stirred for another 2 hours. The reaction is then stopped by the addition of about 5 parts by volume of methanol. About 100 parts of the 52 percent polyurethane solution contain 13.6 milliequivalents of tertiary nitrogen; about 100 parts of solids contain 26.2 milliequivalents of tertiary nitrogen.

II. About 260 parts of a polyether-thioether glycol of molecular weight 1,570 prepared from about 70 parts of thiodiglycol and about 30 parts of hexanediol-(1,6) are stirred together with about 530.2 parts of toluylene diisocyanate (isomeric ratio of 2,4- : 2,6-isomers = 65:35) for about 50 minutes at about 80° C. After cooling to about 50° C., about 270 parts by volume of acetone, about 98 parts of diethylene glycol, about 5 parts of trimethylolpropane in about 50 parts by volume of acetone, about 104 parts of butanediol-(1,4) and about 78 parts of N-methyldiethanolamine in about 512 parts by volume of acetone are added successively and at the same time slight reflux is maintained by cooling. The reaction mixture is then diluted with about 532 parts by volume of acetone to a solids content of 50 percent. About 100 parts of the solution contain 30.5 milliequivalents of tertiary nitrogen.

III. About 160,000 parts of a polyester diol of phthalic acid, adipic acid and ethylene glycol in the molar ratio of 1:1:2.2 of molecular weight 1,580, are melted at about 70° C. and stirred together with about 44,700 parts of toluylene diisocyanate (isomeric ratio of 2,4-:2,6-isomers = 65:35) for about 1 hour at about 95° to about 105° C. After cooling to about 55° C., about 79,000 parts of acetone (water content 0.2 percent) 16,000 parts of N-methyldiethanolamine and again 69,000 parts of acetone are added in succession. The reaction mixture is then stirred at about 50° C. for about 80 minutes until the viscosity is about 15 poises/25° C., and a solution of about 4,880 parts of 1,3-dimethyl-4,6-bis-chloromethylbenzene in about 22,800 parts of acetone is then added. About 10 minutes later, a further 63,000 parts of acetone are added and the solution is stirred until the viscosity has again risen to about 15 poises/25° C. In order to remove any isocyanate groups still present, about 320 parts of dibutylamine in about 3,200 parts by volume of acetone are added. About 100 parts of the 49 percent polyurethane solution contain 23.9 milliequivalents of tertiary nitrogen, 5.2 milliequivalents of quaternary ammonium nitrogen and 5.2 milliequivalents of the reactive group $Ar-CH_2-Cl$. About 100 parts of solids contain 48.9 milliequivalents of tertiary nitrogen, 10.6 milliequivalents of quaternary ammonium nitrogen and 10.6 milliequivalents of the reactive group $Ar-CH_2-Cl$.

IV. About 250 parts of the polyester diol used in III and about 371 parts of toluylene diisocyanate (isomeric ratio of 2,4-:2,6-isomers = 65:35) are stirred for about half hour at about 80° C. When this has cooled to about 55° C., about 200 parts by volume of acetone, about 140 parts of diethylene glycol, a solution of abut 8.42 parts of trimethylolpropane in about 43 parts by volume of acetone, and about 60 parts of N-methyldiethanolamine in about 350 parts by volume of acetone are added in succession. The reaction mixture is stirred for about 80 minutes at about 55° C., the solution becoming very viscous during this operation and the solution is diluted with about 450 parts by volume of acetone and stirred for a further 150 minutes. About 2 parts of dibutylamine are added to the viscous solution to stop the reaction. About 100 parts of the 50 percent solution contain 30.4 milliequivalents of tertiary nitrogen.

V. About 750 parts of a mixed ester of adipic acid, hexanediol and neopentyl glycol (molar ratio 16:11:6), OH number 6.2, acid number 1.3 are dehydrated under vacuum and reacted with about 132.5 parts of 1,6-hexamethylenediisocyanate for about 2 hours at about 110° C. About 40.1 parts of diethylene glycol in about 600 parts by volume of acetone (water content 0.24 percent) and about 4 drops of dibutyl tin dilaurate are added to the viscous mass at about 70° C. The reaction mixture is stirred at about 60° C. until the viscosity of the solution no longer rises (15 hours) and the solution is diluted with about 900 parts by volume of acetone. After another 8 hours' stirring, about 600 parts by volume of acetone are again added.

A 36 percent polyurethane solution is obtained which forms a themoreversible subsidary valency gel at room temperature.

VI. About 750 parts of the mixed polyester used in V are reacted with about 132.5 parts of 1,6-hexamethylenediisocyanate at about 110° C. for about 2 hours. About 45 parts of N-methyldiethanolamine in about 600 parts by volume of acetone and 2 drops of dibutyl tin dilaurate are added to the viscous mass at about 70° C. The solution is stirred for about 24 hours at about 60° C., treated with about 900 parts by volume of acetone, again stirred about 60° C. for about 12 hours and diluted with about 600 parts by volume of acetone. To complete quaternization, about 47.6 parts of dimethylsulfate are added to the solution. A 36 percent polyurethane solution is obtained.

VII. About 500 parts of the mixed polyester used in V are dehydrated under vacuum and about 162.5 parts of 4,4'-diphenylmethanediisocyanate are added at about 60 ° C. The reaction mixture is then stirred for about 30 minutes at about 100° C. After cooling to about 70° C., about 312 parts by volume of acetone, about 39.0 parts of N-methyldiethanolamine, a further 27 parts by volume of acetone, about 15.25 parts of 1,3-dimethyl-4,6-bis-chloromethylbenzene in about 90 parts by volume of acetone, still a further 305 parts by volume of acetone are added successively to the viscous mass. After about 1 hour's stirring from about 50° to about 55°C., the solution has become viscous. Any isocyanate groups still present are converted into urea groups by the addition of about 2 parts of dibutylamine in about 30 parts by volume of acetone. The viscous solution formed contains 47.5 percent of polyurethane and is stable when stored for several hours.

VIII. About 4,010 parts of anhydrous mixed polyester of 1,6-hexanediol and 2,2-dimethylpropanediol-(1,3) in a molar ratio of 22:12 and adipic acid (OH number 64, acid number 1) and about 386 parts of butanediol-(1,4) are reacted at about 160° C. with about 1,604 parts of 4,4-diphenylmethanediisocyanate in an open apparatus equipped with stirrer, and the homogeneous reaction melt is poured into steel vats at about 180° C. When cooled to room temperature, the plates of the resulting polyurethane which are about 2 cm. in thickness, are granulated. The granulate is dissolved in about 54,000 parts of tetrahydrofuran and heated with about 4 parts of dibutyl tin (IV)-dilaurate under reflux for about 5 hours.

IX About 3,403 parts of mixed polyester of 1,6-hexanediol, 2,2-dimethyl-propanediol-(1,3) and adipic acid according to VIII, about 1,675 parts of the polyester of ethylene glycol and adipic acid (OH number 56, acid number 1), about 147 parts of 1,4-butanediol, and about 775 parts of 1,6-hexamethylene diisocyanate are reacted at from about 130° to about 140° C. and heated at about 100° C. for about 5 hours. The polyurethane obtained is granulated and dissolved at elevated temperature in about 54,000 parts of tetrahydrofuran.

A 1 - Preparation of polyurethane dispersions:

About 300 parts of an acetonic polyurethane solution which are prepared from about 750 parts of a mixed polyester according to VIII,
about 152 parts of 1,6-hexamethylene diisocyanate,
45 parts of N-methyldiethanolamine, and
760 parts of acetone are added to the isocyanate-free polyurethane solution VIII, and the solution is converted at about 50° C. into the phosphoric acid salt by the addition of 660 parts of 0.85 percent phosphoric acid solution in tetrahydrofuran. About 22,000 parts by volume of water are then run in at the same temperature over a period of half hour, after which the tetrahydrofuran and acetone are distilled off under reduced pressure. A 24 percent aqueous, coarse particled polyurethane dispersion is obtained which sediments but can be redispersed whenever desired.

A 2:

To solution IX are added about 600 parts of the solution in acetone of a polyurethane containing tertiary nitrogen, which solution was employed in the manner described in A 1, and then about 1,350 parts of 0.85 percent phosphoric acid solution in tetrahydrofuran and about 23,000 parts by volume of water are added.

After removal of the solvent by distillation, a 25 percent aqueous, finely divided polyurethane dispersion remains which is also redispersible.

Preparation of the aqueous polyurethane suspensions A 3–A 14

General procedure: The polyurethane solution is reacted with the given quantities of alkylating agent, and if required, isocyanates, acids dissolved in water are added if required, and water is added with stirring. Stirring is continued until a sample of the suspension is insoluble in 10 times its quantity of acetone, which happens after 1 to 4 hours. The solvent is then distilled off or decanted and replaced by fresh water.

| Serial No. | Starting Number | Polyurethane solids, parts | Diisocyanate parts | Alkylating agent, parts | Reaction time at 55° C. (minutes) | Acid in H₂O Acid, parts | H₂O parts | Water In parts | At °C. | Stirring time (hours) | Result |
|---|---|---|---|---|---|---|---|---|---|---|---|
| A3 | III | 100 | 3H | 0.888 DMS | 10 | | | 140 | 20 | 2 | Fine suspension, sediment slowly, redispersible after 2 months. |
| A4 | III | 100 | 3H | | (120) | 0.4 A | 40 | 180 | 20 | 3 | Coarse suspension, easily redispersible after 1 month. |
| A5 | III | 100 | | | (120) | 0.68 P | 60 | 140 | 20 | 6 | Coarse suspension, easily redispersible after 2 months. |
| A6 | III | 100 | | | (120) | | | 140 | 70 | 20 | Do. |
| A7 | III | 100 | 3H | 0.266 DMS | 10 | | | 140 | 30 | 3 | Coarse suspension, easily redispersible after 3 months. |
| A8 | I | 100 | | 3.61 D | 120 | 3.8 A | 100 | 100 | 55 | 1 | Coarse suspension, easily redispersible after 12 months. |
| A9 | I | 100 | | { 0.67 D +0.2 DMS } | 200 | 3.8 A | 100 | 100 | 55 | 4 | Coarse suspension, easily redispersible after 1 month. |
| A10 | I | 100 | | { 0.96 D +0.256 DMS } | 120 | | | 1600 | 23 | 3 | Coarse suspension, easily redispersible after 24 months. |
| A11 | IV | 100 | 3H | 0.7 D | 60 | 2.0 L | | 150 | 50 | 1 | Coarse suspension, easily redispersible after 2 months. |
| A12 | IV | 100 | 3H | 0.6 X | 60 | 1.8 L | | 150 | 50 | 1 | Do. |
| A13 | IV | 100 | 3H | { 0.92 B 0.5 D } | 60 | 1.8 L | | 150 | 50 | 1 | Do. |
| A14 | II | 100 | | { 0.56 DMS 0.5 D } | 360 | | | 150 | 20 | 2 | Coarse suspension, easily dispersible after 10 days. |

The symbols given in the above tables have the following meanings:

H = 1,6-hexamethylene diisocyanate
B = 4,4'-bis-chloromethyl-diphenylether
D = dichlorodurene (1,3-dimethyl-4,6-bis-chloromethyl-benzene)
DMS = dimethylsulfate
A = acetic
L = latic acid
P = phosphoric acid
X = p-xylylene dichloride

A 15:

About 500 parts of a polyester of hexanediol, neopentyl glycol and adipic acid (molar ratio of diols 11:6) of OH number 68.4, which has been dehydrated at 15 mm. Hg and about 130° C., and about 95 parts of hexamethylene-1,6-diisocyanate are stirred together for about 1 hour at about 120° C. The reaction mixture is left to cool and a solution of about 20 parts of N-methyldiethanolamine in about 50 parts by volume of acetone is added at a temperature of about 60° C. After about 2 hours, the reaction mixture is diluted with about 100 parts by volume of acetone, and after a further hour with about 200 parts by volume acetone; the acetone contains 0.2 to 0.3 percent of water. A solution of about 16.2 parts of 1,5-dimethyl-2,4-bis-chloro-methyl-benzene in about 50 parts by volume of acetone is then added and the reaction mixture is stirred for a further hour at a reaction medium temperature of about 60° C. before it is diluted with about 600 parts by volume of acetone. About 4.8 parts of glacial acetic are then added to the solution and about 1,000 parts by volume of water are run in with stirring. The temperature of the reaction medium is slowly raised to about 85° C. and the acetone is distilled off under normal pressure. An aqueous, sedimenting dispersion results which can be redispersed simply by shaking. The elongated particles, about 3 $\mu$ in length, are insoluble in dimethylformamide.

A 16:

The polyurethane is synthesized in the same way as in A 15 but without the addition of glacial acetic acid. In this case, a sedimenting dispersion of spherical particles having a diameter of 20 to 60 $\mu$ is obtained, which particles are insoluble in dimethylformamide.

A 17:

About 500 parts of a polyester of hexanediol, neopentyl glycol and adipic acid (OH number 63) and about 99.5 parts of hexamethylene-1,6-diisocyanate are stirred together for about 1 hour at about 120° C. The solution of about 20 parts of N-methyldiethanolamine and about 20 parts of N,N-bis-($\beta$-hydroxyethyl)-N'-methoxymethyl-urea in about 100 parts by volume of acetone is added at a bath temperature of about 60° C. and the reaction mixture is stirred for about 1 hour at a bath temperature of about 60° C. It is diluted with about 200 parts by volume of acetone (water content 0.2 to 0.3 percent) and left to stand overnight. After further dilution with about 910 parts by volume of acetone, a solution of about 9.6 parts of 1,5-dimethyl-2,4-bis-chloromethyl-benzene in about 50 parts by volume of acetone is added and the reaction mixture is stirred for a further hour at a temperature of about 60° C. About 3.6 parts by volume of 85 percent phosphoric acid are then added followed by about 800 parts by volume of water. A sedimenting, redispersible dispersion of particles of the order of 10 $\mu$ which are insoluble in tetrahydrofuran is obtained.

A 18:

About 150 parts of V and about 50 parts of VI are mixed, and about 100 parts by volume of water are added in the course of about 10 minutes while the mixture is stirred, and organic solvent is removed under vacuum. A white, coarse particled polyurethane suspension is obtained which sediments rapidly and can easily be redispersed. About 100 parts of freshly dispersed suspension are vigorously shaken with about 50 parts of water and about 7 parts of 2,4-toluylene diisocyanate. The viscosity increases and a stirrable paste is obtained, the particles of which are insoluble in 10 times the quantity of tetrahydrofuran or dimethylformamide.

A 19:

The same procedure is employed as under A 18 but using about 400 parts of V and about 10 parts of VI. The particles of the resulting paste are slightly larger than those obtained in A 18 and again insoluble in dimethylformamide. In order to render the paste fluid a further 500 parts of water are worked in.

A 20:

A solution of about 12 parts of 85 percent phosphoric acid in about 50 parts water is added to 1,000 parts of polyurethane solution III. About 600 parts by volume of water which is at a temperature of about 10° C. are slowly stirred in at about 10° C. A coarse suspension is obtained, a sample of which dissolves in dimethylformamide to form a clear solution. After about 6 hours' stirring at room temperature, the particles of the suspension become insoluble in dimethylformamide. The acetone is then distilled off under vacuum at a bath temperature of about 30° C. The suspension formed sediments on standing but can easily be redispersed. The particles have a diameter of about 5 to 10 $\mu$.

A 21:

A solution of about 12 parts of 85 percent phosphoric acid in about 50 parts of water is added to about 1,000 parts of polyurethane solution III. About 600 parts by volume of water at about 60° C. are slowly stirred in at about 55° C. An opaque, viscous aqueous colloidal solution is obtained which is freed from acetone under vacuum.

About 200 parts of the resulting finely divided viscous completely stable latex, which as a solids content of about 45 percent and dissolves in dimethylformamide to form an almost clear solution are diluted with about 200 parts of water and mixed during the course of about 15 minutes with a solution of about 2 parts of sodium sulfate in about 100 parts of water, with stirring. The dispersion is converted into a fine coagulate within about 2 hours. The stiff, coagulated mass is stirred up with water in a conventional mixing apparatus, a fluid, unstable dispersion being formed.

A 22:

About 760 parts of solution VII are stirred together with a solution of about 3 parts by volume of 85 percent phosphoric acid in about 30 parts by volume of water, the viscosity thereby rising. About 650 parts by volume of water at a temperature of about 20° C. are added with stirring in the course of about 10 minutes to the solution which is at a temperature of about 50° C. The acetone is then distilled off under vacuum. A coarse, 35 percent suspension is obtained, the particles of which are insoluble in dimethylformamide. The suspension rapidly sediments. The sediment can easily be dispersed, even after several months, simply by stirring with a glass rod. A 75 percent paste is readily obtained by decanting.

A 23:

Solution II is diluted with acetone to a solids content of 43 percent. About 12.6 parts of dimethylsulfate and about 5.4 parts of p-xylylene dichloride in about 28 parts by volume of acetone are added at about 45 to about 50° C. to the viscous, cloudy solution in the course of about 10 minutes. The mixture is stirred for about one hour, the viscosity rising and partial separation of the components taking place. A solution of about 13.5 parts of 85 percent phosphoric acid in about 100 parts by volume of water is now added, whereupon the solution becomes homogeneous and clear. About 650 parts by volume of water at about 20° C. are rapidly stirred in (temperature of the water bath about 40° C.) and the acetone is distilled off under vacuum. A coarse suspension is obtained which sediments and can easily be redispersed.

A 24:

About 500 parts of a polyester of hexanediol, neopentyl glycol and adipic acid (OH number 67) which has been dehydrated at about 15 mm. Hg and about 130° C. are stirred together with about 114.3 parts of hexamethylene-1,6-diisocyanate for about 2 hours at temperatures between about 110° and about 120° C. The reaction mixture is left to cool, and the solution of about 4 parts of N-methyldiethanolamine in about 20 parts by volume of acetone is added at a bath temperature of about 60° C., and the reaction mixture is stirred for a further 2 hours and diluted with about 100 parts by volume of acetone (water content 0.20 to 0.25 percent). The product is then quaternized with about 3.12 parts by volume of dimethylsulfate and diluted with a further 580 parts by volume of acetone.

A solution of about 5.6 parts of diethylene triamine in about 900 parts by volume of water is run in at a bath temperature of about 60° C., with stirring. After removal of the acetone by distillation, an approximately 44 percent aqueous dispersion of particles of about 10 to 15 $\mu$ is obtained, which particles are insoluble in dimethylformamide and combine to form larger agglomerates. This dispersion settles but can be redispersed by shaking.

A 25:

About 500 parts of propylene glycol-(1,2)-polyether (OH number 56) and about 210 parts of diphenylmethane-4,4'-diisocyanate are stirred for about 1 hour at about 90° C. The reaction mixture is left to cool to about 50° C., solution of about 2 parts of N-methyldiethanolamine in about 50 parts by volume of acetone is added, and the reaction mixture is stirred for about 30 minutes at a bath temperature of about 60° C. After dilution with about 100 parts by volume of acetone, about 3.12 parts by volume of dimethylsulfate are added and the reaction mixture is stirred for a further 30 minutes. The solution is left to stand overnight. It is diluted with 1,000 parts by volume of acetone, and a solution of about 4.5 parts of pentaethylene hexamine is run in with stirring. After removal of the acetone by distillation, an approximately 30 percent dispersion of particles of the order of 50 to 100 $\mu$ which are insoluble in dimethylformamide is obtained, which dispersion sediments and is redispersible.

A 26:

About 2 parts of N-methyldiethanolamine dissolved in about 20 parts by volume of acetone are stirred together with about 28.2 parts of hexamethylene-1,6-diisocyanate for about 30 minutes at a bath temperature of about 60° C. About 1.56 parts by volume of dimethylsulfate are added and the reaction mixture is stirred for a further 30 minutes. A solution of about 100 parts of a diamine of average molecular weight 1,400 in about 140 parts by volume of acetone is then run in at about 20° C. and stirred for about 15 minutes. The diamine is obtained by reacting a polypropylene glycol ether with nitrophenyl isocyanate, followed by reduction, in accordance with the procedure with U.S. Pat. No. 2,888,439.

A solution of about 2.4 parts of pentaethylene hexamine in about 400 parts by volume of water is run into this solution at room temperature with stirring, and the acetone is distilled off under reduced pressure. A dispersion of particles of 20 to 80 $\mu$ insoluble in dimethylformamide is obtained, which particles settle but can easily be redispersed.

A 27:

About 500 parts of a dehydrated polyester of hexanediol, neopentyl glycol and adipic acid (OH number 68.4) and about 95 parts of hexamethylene-1,6-diisocyanate are stirred for about 1 hour at about 120° C. The reaction mixture is left to cool, and the solution of about 20 parts of N-methyldiethanolamine in about 50 parts by volume of acetone is added at a bath temperature of about 60° C. After about 2 hours, the reaction mixture is diluted with about 100 parts by volume of acetone, and after a further hour with about 200 parts by volume of acetone. The acetone contains 0.2 to 0.3 percent of water. A solution of about 16.2 parts of 1,5-dimethyl- 2,4-bis-chloromethyl-benzene in about 50 parts by volume of acetone is then added and the reaction mixture is stirred for a further hour at about 60° C. before it is diluted with about 600 parts by volume of acetone. About 1,000 parts by volume of water is then run in with stirring. The bath temperature is slowly increased to about 85° C. and the acetone is distilled off under normal pressure. An aqueous, sedimenting dispersion is obtained which can be redispersed simply by shaking. The particles, which have a size of 20 to 60 $\mu$, are insoluble in dimethylformamide.

A 28:

About 209 parts of a polyester of hexanediol, neopentyl glycol and adipic acid (OH number 67) and about 38 parts of hexamethylene-1,6-diisocyanate are stirred for about 2 hours at about 120° C. The reaction mixture is left to cool to about 50° C. and is then dissolved in about 700 parts by volume of acetone. About 11 parts of an aqueous, 0.935 molar solution of the potassium salt of an adduct of 1,3-propanesultone and ethylene diamine (molar ratio 1:1) are stirred in during a period of about 10 minutes at a bath temperature of about 60° C. (Sultone adducts can be prepared according to German Auslegeschrift No. 1,200,313). To this solution is added a solution of about 4.75 parts of diethylene triamine in about 450 parts by volume of water, with stirring. After removal of the acetone by distillation, an aqueous, sedimenting redispersible dispersion of particles insoluble in dimethylformamide is obtained.

Process according to the invention:

Preparation of microporous sheets from the aqueous dispersions

Examples 1–33:

The polyurethane dispersions A3–A28 are mixed, with vigorous stirring, with the given quantity of cross-linking agents and if indicated subsequently with aqueous solutions of the various additives, before being poured on to porous earthenware slabs or smooth glass plates. The substance is then usually dried at room temperature (or at 10°, 40°, 80° C.) for 24 hours.

The dry foils, which usually only form a loose bond, are carefully lifted from the support and hardened under the given conditions, with sintering and concomitant cross-linking.

Examples 34–37:

The polyurethane dispersions are poured on to earthenware slabs (DIN 16155) covered with cotton batiste, and the water is removed at about 100° C. The dry but still friable foils are consolidated by sintering and concomitant cross-linking under the conditions indicated in the following table, and removed from the textile support and tested.

In the absence of formaldehyde cross-linking, the two test products in the form of the microporous foils are soluble in dimethylformamide whereas if they have been additionally cross-linked they merely swell in that solvent.

END PRODUCT

| Example number | Dispersion No. | Percent | Cross-linking agent[1] | Additives | Drying at— | Consolidation at— Minutes | Consolidation at— °C. | Appearance | Density | Tensile strength | Behavior in DMF | Permeability to H₂O |
|---|---|---|---|---|---|---|---|---|---|---|---|---|
| 1 | A3 | | 15H | | RT | 10 | 120 | Cloudy untransparent | | Moderate | Insoluble at 80° C | Moderately good. |
| 2 | A4 | | 15H | | RT | 10 | 120 | Cloudy untransparent | | Moderate | Insoluble at 80° C | Moderately good. |
| 3 | A5 | | 10H | 2% Na₂Cr₂O₇; H₃PO₄, pH=2 | RT | 20 | 100 | Cloudy untransparent | | Moderate | Insoluble at 80° C | Moderately good. |
| 4 | A6 | | 10H | | RT | 5 | 140 | Cloudy untransparent | | Moderate | Insoluble at 80° C | Moderately good. |
| 5 | A7 | | 10H | | RT | 5 | 140 | Cloudy untransparent | | Moderate | Insoluble at 80° C | Moderately good. |
| 6 | A8 | | 10H | H₃PO₄, pH=2 | RT | 10 | 160 | Completely untransparent, coarse structure | <1 | Very good | Insoluble at 140° C | Good. |
| 7 | A9 | | | | | | | | | | | |
| 8 | A10 | | | | | | | | | | | |
| 9 | A11 | | 12B | | RT | 30 | 130 | Untransparent, microscopically visible structure | <1 | Good | Insoluble at 80° C | Moderately good. |
| 10 | A12 | | | | | | | | | | | |
| 11 | A13 | | 10Q | | RT | 30 | 100 | Untransparent fine structure | <1 | do | do | Good. |
| 12 | A14 | 42 | | | | | | | | | | |
| 13 | A15 | 42 | 10H | H₃PO₄, pH=2 | RT | 60 | 100 | White microscopically visible structure | <1 | do | Insoluble at 100° C | Very good. |
| 14 | A16 | 48 | | | | | | | | | | |
| 15 | A17 | 40 | | | | | | | | | | |
| 16 | A18 | 30 | 20H | Maleic acid, pH=2 | 80° C. | 60 | 140 | Untransparent, microscopically visible structure | <1 | Moderate | Insoluble in boiling DMF | Good. |
| 17 | A19 | 32 | 20Q | 1% NaCl | RT | 60 | 110 | Milky white | ~1 | Good | Insoluble at 100° C | Moderately good. |
| 18 | A20 | 50 | | | | | | | | | | |
| 19 | A21 | 24 | 10D | 1% CaCl₂ | RT | 30 | 100 | White, structure visible | 0.9 | do | Insoluble at 80° C | Good. |
| 20 | A22 | 35 | 15Q | Q in methanol | RT | 20 | 135 | Untransparent, structure microscopically visible | <1 | Very good | Insoluble at 100° C. (4 hours) | Very good. |
| 21 | A22 | | 30RL | | 40° C. | 20 | 135 | | | | | |
| 22 | A22 | | 5D | H₃PO₄, pH=2 | RT | 20 | 165 | Untransparent, structure microscopically visible | <1 | Very good | Insoluble at 100° C. (4 hours) | Good. |
| 23 | A22 | | 5H | | RT | 20 | 135 | | | | | |
| 24 | A22 | | 5F | | RT | 20 | 140 | Untransparent, structure microscopically visible | | Very good | Insoluble at 100° C. (4 hours) | Good. |
| 25 | A22 | | 1H | H₃PO₄, pH=2 | RT | 20 | 170 | | | | | |
| 26 | A22 | | 20H | | RT | 20 | 170 | Untransparent structure microscopically visible | | Very good | Insoluble at 100° C. (24 hours) | Good. |
| 27 | A22 | | 50H | H₃PO₄, pH=2 | RT | 20 | 170 | | | | | |
| 28 | A23 | 52 | 12B | 1% NaCl | 10° C. | 2 hr. | 80 | White, very hard, structure visible | 0.8 | Good | Insoluble at 80° C | Good. |
| 29 | A24 | 44 | | | | | | | | | | |
| 30 | A25 | 30 | | | | | | | | | | |
| 31 | A26 | 50 | 20H | H₃PO₄, pH=3.5 | RT | 1 hr. | 100 | White, microscopically visible structure | 0.5–1.0 | Good | Insoluble at 100° C. (exposed to solvent for 5 to 24 hours) | Very good. |
| 32 | A27 | 48 | | | | | | | | | | |
| 33 | A28 | 48 | | | | | | | | | | |

NOTES:
H = Hexamethylolmelamine ether.
D = Dimethylol-hexahydro-pyrimidone.
B = Bis-urethane from hexanediol and 3-chloromethylphenylisocyanate.
Q = Hexamethylene-bis-chloroacetamide.
RL = Reactive latex, preparation according to III, but reacted with 72.5 g. of 1,3-dimethyl-4,6-bis-chloromethylbenzene and 2.5 cc. of glacial acetic acid, based on 50 g. of N-methyl-diethanolamine.
F = 20% formaldehyde solution.

[1] Percent based on solids content of the dispersion.

| Example | Poly-urethane dispersion | Formal-dehyde[1] | Sintering Temperature, (°C.) | Sintering Time (min.) | Foil thickness (mm.) | Tensile strength DIN 53504 (kg. wt./cm.²) | Elongation on tearing DIN 53504 (percent) | Permeability to water vapor DIN 53122 day |
|---|---|---|---|---|---|---|---|---|
| 34 | A 1 | 3 A/1 M | 170 | 5 | 0.38 | 34 | 262 | 1,356 |
| 35 | A 1 | 2 B/1 E | 170 | 5 | 0.28 | 37 | 277 | 1,224 |
| 36 | A 1 | 3 C/1 E | 170 | 5 | 0.48 | 25 | 203 | 1,164 |
| 37 | A 2 | 3 A/1 M | 125 | 5 | 0.65 | 37 | 590 | 612 |
| Comparison example. | A 2 | None | 125 | 5 | 1.36 | 18 | 383 | 785 |

[1] Splitter/and acid (percent by weight based on test substance).

NOTES:
A = dimethlol-ethylene urea.
B = hexa-(methoxymethyl)-melamine.
C = Dimethylol-hexahydropyrimidone.
M = maleic acid.
E = monochloroacetic acid.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the production of microporous sheets which comprises applying to a surface a layer of an aqueous polyurethane dispersion which contains in the solid form free from fillers:
   A. from about 65 to about 99 percent by weight of polyurethane or polyurea microgel particles insoluble in methyl ethyl ketone and infusible into a homogeneous mass at temperatures below about 60° C., said particles having a diameter of from about 2 to about 500 microns and containing on their surface reactive groups selected from —C C—, hydroxyl, amino, urethane, urea, amide, hydrazide, epoxy, methylol, methylol ether, carboxyl, bromomethyl, chloromethyl, mercapto and sulfide,
   B. from about 1 to about 35 percent by weight of a member selected from the group consisting of (a) thermoplastic polymers containing at least two groups reactive with the reactive groups of (A) for every 2,000 molecular weight units or (b) a compound which is reactive with the surface reactive groups of (A) selected from the group consisting of formaldehyde, a methylol ether, methylol ketone, a formaldehyde urea resin, a formaldehyde melamine resin, melamine urea, a phenol, a formaldehyde phenol resin, a quaternizing agent with chloromethyl, or bromomethyl groups, an isocyanate splitter, sulfur peroxides, polyepoxides, polyvinylalcohol, a polyamine and a polysulfide, subjecting the layer to an elevated temperature below the temperature at which the particles will fuse into a homogeneous mass to chemically cross-link and sinter the particles.

2. The process of claim 1, wherein (A) comprises nonspherical particles that are insoluble in tetrahydrofuran and have an average maximum diameter of 20 to 2,000 μ and a Shore hardness A of 30 to 98 measured on the homogeneous product.

3. The process according to claim 1, wherein (B) is a water-soluble thermoplastic polyurethane that has reactive groups.

4. The process of claim 1, wherein (B) is a water-dispersible polyurethane or water-dispersible polyurea containing reactive groups.

5. The process of claim 1, wherein the surface of (A) contains groups reactive with formaldehyde and (B) is a derivative of formaldehyde.

6. The process of claim 1, wherein the surface of (A) contains alkylatable mercapto groups, sulfide sulfur groups or basic nitrogen atoms and (B) is a polyfunctional alkylating agent, polyacid or mixtures thereof.

7. The process of claim 1, wherein the surface of the (A) contains reactive halogen atoms and (B) is a polyamine or polysulfide.

8. The process of claim 1, wherein the surface of (A) contains acid groups and (B) is a polyfunctional base.

9. The process of claim 1, wherein the surface of (A) contains olefinic double bonds and (B) contains groups reactive with olefinic double bonds.

10. The process of claim 1, wherein (B) is a radical forming agent or sulfur vulcanization agent.

11. The process of claim 1, wherein the polyurethane dispersions or pastes are subjected to temperatures between 50° and 180° C. with concomitant shaping.

12. The process of claim 1, wherein (A) contains a cationic or anionic salt-type polyurethane.

13. The product prepared by the process of claim 1.

* * * * *